Sept. 27, 1932.  E. T. HURST  1,879,268
PIE PAN
Filed June 30, 1931
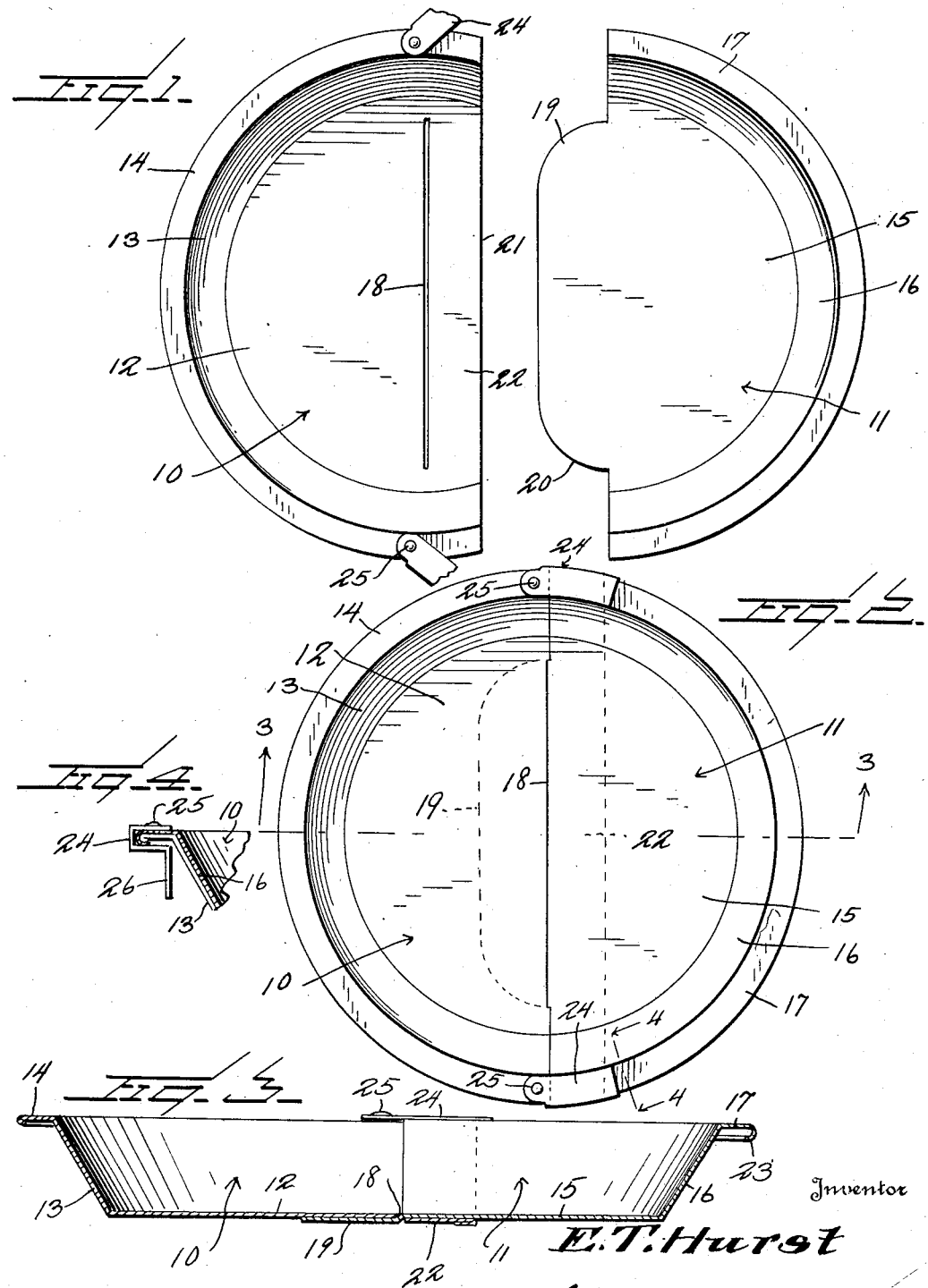

Patented Sept. 27, 1932

1,879,268

UNITED STATES PATENT OFFICE

ELIZABETH T. HURST, OF OLYMPIA, WASHINGTON

PIE PAN

Application filed June 30, 1931. Serial No. 547,955.

This invention relates to pie pans, and more particularly to separable pans.

An object of this invention is to provide a pan in two sections, whereby the sections, when placed together, will form a conventional pan, these sections being separable so as to permit the ready removal of the pie after it has been baked.

Another object of this invention is to provide in a device of this kind means by which pies of various kinds may be baked in the conventional manner and after the pie has been baked, it may be removed from the pan without breaking of the crust so that the juices of the pie filling will not become discolored through the chemical reaction from the pie tin.

The above and various other objects and advantages of this invention will in part be described in and in part be understood from the following detailed description of the present preferred embodiment, the same being illustrated in the accompanying drawing, wherein:—

Figure 1 is a detail top plan view of a pie pan constructed according to the preferred embodiment of this invention, showing the separable sections away from each other;

Figure 2 is a similar view but showing the sections engaging each other so as to form a conventional pie pan;

Figure 3 is a sectional view taken on the line 3—3 of Figure 2, and

Figure 4 is an enlarged fragmentary sectional view taken on the line 4—4 of Figure 2.

Referring to the drawing wherein like numerals of reference designate corresponding parts throughout the several views, the numeral 10 designates one separable section and the numeral 11 designates generally another separable section of a pie tin constructed according to the preferred embodiment of this invention.

This section 10 is constructed so as to be slightly larger than a half circle or disk, and has a bottom plate 12 provided with an upwardly inclined edge portion 13 terminating in a flange 14. In like manner, the separable section 11 has a bottom 15 provided with an upwardly inclined marginal edge portion 16, which terminates in a flange 17 disposed in substantially parallel relation to the bottom 15. This bottom 12 of the pan section 10 has an elongated slot 18 therethrough which is disposed diametrically of the pan and the ends of this slot 18 terminate intermediate the periphery of the bottom 12.

The pan section 11 has an elongated tongue or lip 19 having curved end portions 20, which lip 19 is adapted to extend through the slot 18 and be disposed beneath the bottom 12. Preferably, that portion of the bottom 12 disposed intermediate the slot 18 and the straight edge portion 21 thereof is downwardly offset, as at 22, and which is clearly disclosed in Figure 3 of the drawing. In like manner, the lip 19 is downwardly offset so that when the lip 19 is disposed in the slot 18, the upper surface of each bottom section 12 and 15 will be substantially flush one with the other.

Preferably, one of the pan sections has a relatively flat crimped edge portion 14, as disclosed in Figure 3 of the drawing, and the other pan section has a substantially U-shaped flange 23 which is adapted to telescope the end of the other flange when the two pan sections are put together. In order to securely lock these pan sections 10 and 11 together, I have provided locking members 24 which are pivoted to the pan section 10 by means of a pintle or pivot 25. These lock-members 24 are constructed in substantially U-shaped form for engagement about the flanges 14 and 17, and the lower free arm of the locking member 24 has a depending plate or extension 26 by means of which the locking member 24 may be readily swung into either locking or released position.

The practice at present in the baking of pies and particularly berry pies, is to leave the pie within the tin, but where the juices of the filling are of an acid nature, these juices upon soaking through the crust of the pie, become discolored through chemical reaction from the tin of the pie pan and the discoloring of the acids also discolors the crust of the pie.

However, through the provision of a pie pan, as disclosed herein, the crust of the pie may be readily removed therefrom by swinging the locking members 24 into released position and pulling the two pie sections 10 and 11 away from each other. The pie crust may then be placed on a plate and served in the usual manner.

It is, of course, understood that various changes and modifications may be made in the details of construction and design of the above specifically described embodiment of this invention without departing from the spirit thereof, such changes and modifications being restricted only by the scope of the following claims.

I claim:—

1. A pan of the character described comprising a pair of separable pan sections having straight confronting edge portions, one of said pan sections having an elongated slot therein disposed parallel with the straight edge of said one section, a lip formed with the other of said sections and removably engaging in said slot, and means for holding said sections together.

2. A pan of the character described comprising a pair of separable pan sections, one of said sections having a diametrically disposed slot therein and a downwardly offset portion extending outwardly from the slot, a tongue formed with the other of said sections, said tongue being offset from the bottom of said section whereby to dispose the bottom of each section one flush with the other, and clamping means carried by one of said sections and engaging the other section whereby to hold said sections together.

In testimony whereof I hereunto affix my signature.

ELIZABETH T. HURST.